United States Patent [19]

Landry, Jr.

[11] Patent Number: 4,568,098
[45] Date of Patent: Feb. 4, 1986

[54] TRAILER HITCH

[76] Inventor: Ernest A. Landry, Jr., 50 Bennett St., Lynn, Mass. 01905

[21] Appl. No.: 515,952

[22] Filed: Jul. 20, 1983

[51] Int. Cl.[4] .......................... B60D 1/04; B60D 1/06
[52] U.S. Cl. ................................ 280/415 A; 280/504; 280/511
[58] Field of Search ............... 280/415 A, 415 R, 504, 280/511, 512, 513

[56] References Cited

U.S. PATENT DOCUMENTS

| 2,431,694 | 2/1947 | Johnson | 280/504 |
| 2,700,555 | 1/1955 | Arend | 280/504 |
| 2,766,995 | 10/1956 | Weiss | 280/504 |
| 2,827,307 | 3/1958 | Osborn | 280/415 A |
| 2,911,233 | 11/1959 | Riddle | 280/415 A |
| 3,779,653 | 12/1973 | Charlton | 280/512 X |
| 3,801,134 | 4/1974 | Dees | 280/415 A |
| 3,837,674 | 9/1974 | Rathsack | 280/415 A |
| 3,944,258 | 3/1976 | Christensen | 280/408 |
| 3,963,266 | 6/1976 | Thelin | 280/504 |
| 4,022,490 | 5/1977 | Rocksvold | 280/504 X |
| 4,029,333 | 6/1977 | Christensen | 280/415 A |
| 4,248,450 | 2/1981 | McWethy | 280/415 A |
| 4,280,713 | 7/1981 | Bruhn | 280/415 A |
| 4,379,569 | 4/1983 | Koch | 280/415 A |

Primary Examiner—John A. Pekar

[57] ABSTRACT

A trailer hitch adapted for attachment to a lunette coupler or a ball coupler comprises a pintle hook and a ball mounted on the hook and adapted to receive a ball coupler, and a closure pivotally mounted on the hook and pivotable between a closed position in engagement with the ball and an open position spaced from the ball. The aperture defined by the closure and the hook includes a lower circular open portion, the center point of the lower circular portion lying on a first horizontal plane substantially bisecting the pattern of attachment of the hitch, the first horizontal plane lying below a second horizontal plane projected tangent to the under surface of the ball, the rearmost point within the aperture defined by the pintle hook and the closure in closed position to receive and hold the lunette, lying the furthest rearward from the vertical plane of the attachment plate, lies within the lower circular portion of the aperture in a horizontal plane passing through the center of the attachment pattern, whereby during towing, the load of the trailer attached by the lunette is evenly distributed over the pattern of attachment. In one further aspect, the hitch includes a second configuration, e.g. a second ball, which may be selectively positioned for towing attachment.

30 Claims, 6 Drawing Figures

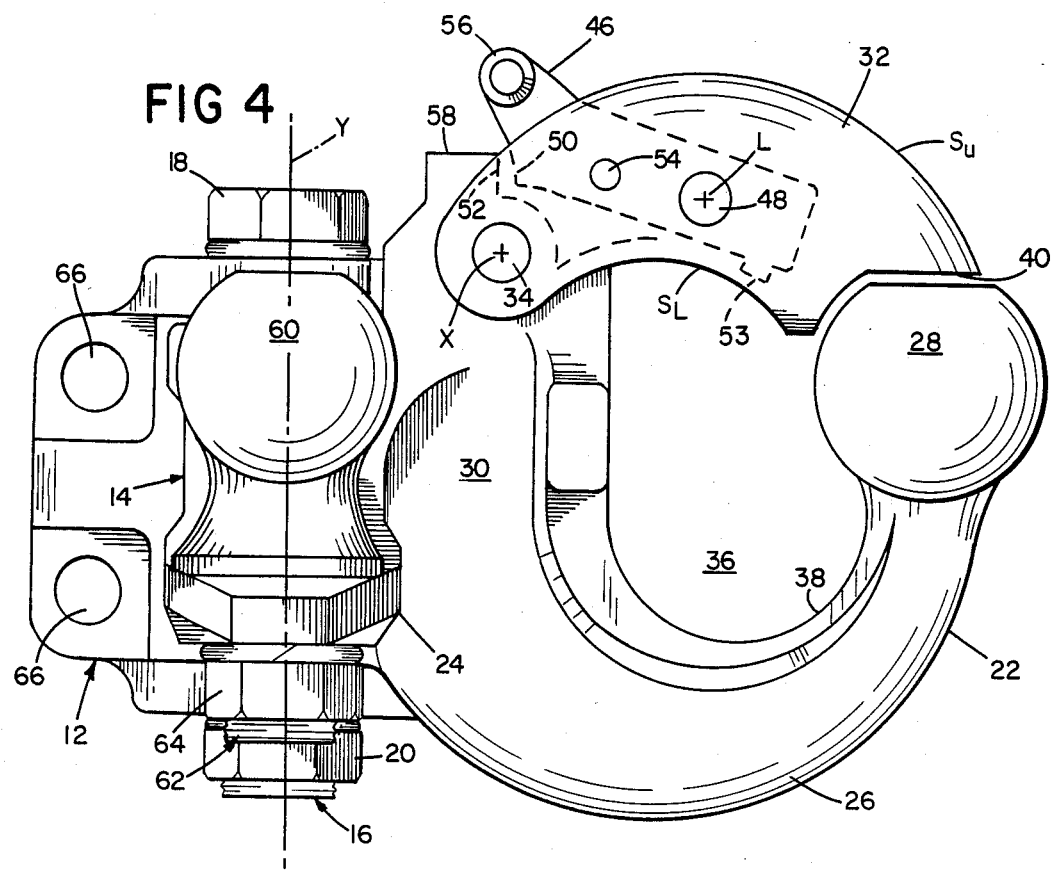
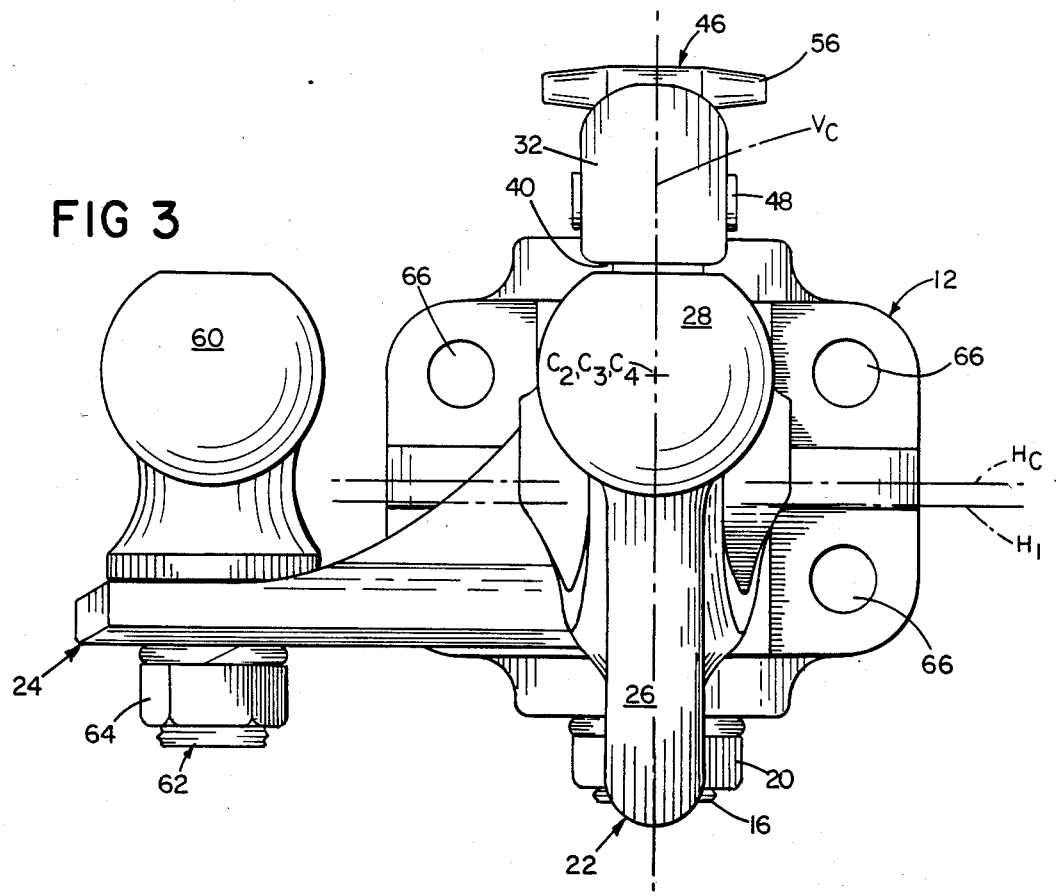

TRAILER HITCH

BACKGROUND OF THE INVENTION

The invention relates to hitches for towing.

Hitches allow vehicles to be attached together for towing, and typically are configured as balls or as pintle hooks. Ball hitches are typically used for lighter loads, e.g. cargo trailers, recreational trailers, etc., while pintle hooks are employed for heavier loads, e.g. portable compressors and construction equipment. Ball hitches come in a variety of standard sizes, dictated by the load to be towed, e.g. a two inch diameter ball typically has a load rating of 5,000 pounds, while a 2 5/16 inch diameter ball has a load rating of 7,000 pounds, and the ball used must correspond to the coupler size on the trailer tongue. Typically the balls are formed on a threaded pin and are removably bolted through a provided hole in the hitch support. The balls are thus easily changed but their construction provides lower ratings because of the susceptibility of threaded pins to shearing, etc., especially due to the diameter restriction on the pin needed to permit the presentation of a spherical undersurface of the ball to the coupler. Pintle hooks have much higher load rating, e.g. 14,000 pounds and higher, depending upon size. Pintle hooks are adapted to receive a lunette, i.e. an annular eye ring at the end of the trailer tongue, through which the hook extends, and typically include a latch for securing the lunette on the pintle hook during towing.

There are numerous situations where trailers have a variety of coupling configurations, e.g. in construction, rental yards, utilities, repair and sales facilities, etc. As has long been recognized it would be desirable to have a reliable, strong, multi-purpose hitch that is easily employed and withstands the rugged environmental conditions to which hitches are normally exposed. Prior suggestions for multiple hitch arrangements have usually required sacrifice of strength, durability or safety with one type of attachment in order to achieve the capability of another type of attachment. Most have also involved serious limitation, still, in the range of attachments that are made possible.

For example, Charlton U.S. Pat. No. 3,779,653 and Thelen U.S. Pat. No. 3,963,266 provide pintle hooks with only a single size ball formed at the hook ends. Use of interchangeable balls, for example with threaded pins, would only provide a load rating approximately that of a standard ball hitch, not acceptable for hauling typical lunette coupled trailers. Furthermore Chandler's and Thelen's constructions are susceptible to damage under a number of circumstances. Osborn U.S. Pat. No. 2,827,307, Riddle U.S. Pat. No. 2,911,233, Dees U.S. Pat. No. 3,801,134 and Christansen U.S. Pat. No. 4,029,333 provide hitches with selectable positions; while Rathsack U.S. Pat. No. 3,837,674 and Koch U.S. Pat. No. 4,379,569 provide converters for attaching other hitch configurations to a pintle hook.

SUMMARY OF THE INVENTION

The invention relates to a trailer hitch adapted for attachment to a lunette coupler or a ball coupler comprising attachment means for affixing the trailer hitch to a vehicle, the means having a pattern of attachment for the hitch to a vehicle, a pintle hook supported by the attachment means, a ball mounted on the free end of the hook and adapted to receive a ball coupler, a closure means pivotally mounted on the base of the hook is mounted and pivotable between a closed position in engagement with the ball and an open position spaced from the ball, latch means for selectively fixing the closure in open and in closed positions, the closure in closed position defining with the hook a closed aperture for holding a lunette therewithin against release, and the closure in open position adapted to permit introduction of the lunette over the ball, and also alternatively permitting a ball coupler to seize the ball.

According to the invention, the closed aperture defined by the closure and hook includes a lower circular open portion, the center point of which lies on a first horizontal plane substantially bisecting the pattern of attachment of the hitch, this first horizontal plane lying below a second horizontal plane projected tangent to the undersurface of the ball, the rearmost point within the aperture defined by the pintle hook and closure in closed position which lies the furthest rearward from the vertical plane of the attachment means, being within the lower circular portion of the aperture in a horizontal plane passing through the center of the attachment pattern, whereby, during towing, the load of the trailer attached by the lunette is evenly distributed over the pattern of attachment.

According to another aspect of the invention, the pintle hook is disposed on a first arm of a hitch support affixed to the attachment means by a hinge pin, the ball formed integrally on the hook, the support being adapted to pivot about the pin from a first position for towing attachment to a lunette coupler or a ball coupler, to a second position, the hitch further comprising a second ball disposed on a second arm of the hitch support in the second position presenting the ball for attachment to a ball coupler, the second ball removably attached to the support, whereby in the first position of the support, the hitch may be attached to a lunette coupler or to a ball coupler of diameter corresponding to that of the first mentioned ball, the pintle hook and the first ball having the load rating of the pintle hook, and in the second position of the support, the hitch may be attached to a ball coupler of the diameter corresponding to that of the second ball.

In preferred embodiments of this aspect of the invention, the first arm of the hitch support is disposed at 90° to the second arm of the hitch support; the hitch support arms are adapted, in position for towing attachment, to align substantially perpendicular to the plane of the attachment means; and the second ball is removable and the second support arm is adapted to receive trailer hitches of other configurations for towing vehicles having corresponding coupler configurations.

In preferred embodiments of both aspects of the invention, the diameter of the lower circular portion of the aperture defined by the closure and the hook is substantially equal to the diameter of the ball; a line projected through the center of the ball and the center of the lower circular portion lies at an angle to the horizontal, preferably the angle is of the order of 45°; the center of the ball is spaced from the center of the lower circular pattern by a distance substantially equal to the diameter of the ball, whereby the inner surface of the hook defining the lower circular portion merges substantially tangentially with the curved undersurface of the ball in a smooth transition; the hook increases forwardly in vertical cross-section; the forward wall of the hook defining the aperture extends substantially vertically to approximately the height of the ball; the hook and ball are integrally formed; the closure increases rearwardly in vertical dimension, the upper surface of the closure following a curve centered in a horizontal plane approximately bisecting the center of the ball, and the curve having a radius of approximately the same, but slightly less, length than the distance between the center of the ball and the center of the curve, whereby the upper surface of the closure closely overlies the ball and provides a smooth transition with the surface thereof, and the surface of the ball extends rearward beyond the end of the closure for protection during backing; the closure increases rearwardly in vertical dimensions, the lower surface of the closure follows a curve centered in a horizontal plane approximately bisecting the center of the ball, the center of the curve lying forwardly of the center of the curve of the upper closure surface, whereby the projection of the lower surface of the closure comes approximately tangent to the forward surface of the ball; and the inner closure surface intersects the forward vertical wall of the hook defining the aperture at a point approximately adjacent the peak of the curve, whereby the lower closure surface has virtually no rearwardly projected vertical extent exposed to possible impact.

DESCRIPTION OF THE PREFERRED EMBODIMENT

We first briefly describe the drawings.

Drawings

FIG. 2 and FIG. 3 are top and face views, respectively, of FIG. 1, with the closure in FIG. 2 shown partially in sections.

FIG. 4 is a face view of the trailer hitch of FIG. 1, with the ball in towing position, and the pintle hook closure latch shown in dashed line, while

Structure

Figure 1:
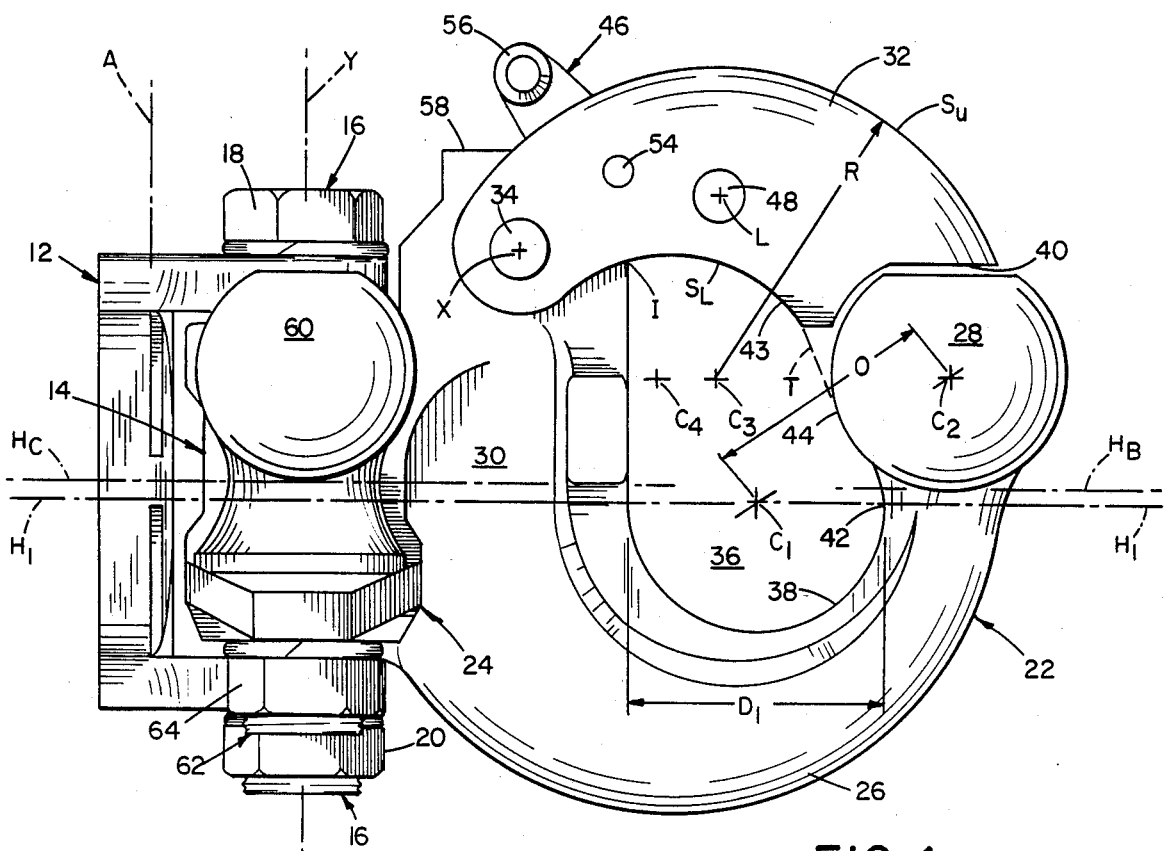
FIG. 1 is a side view of a trailer hitch according to the invention, with the pintle hook in towing position.

Referring to FIG. 1, the trailer hitch is provided with attachment means, in this case bolt-up pad 12 to which is pivotably attached hitch support 14 by means of heavy duty, large diameter, vertical hinge pin 16 through aligned holes in bolt-up pad 12 and support 14. Pin 16 is held in place by head 18 and threaded nuts 20.

Figure 2:
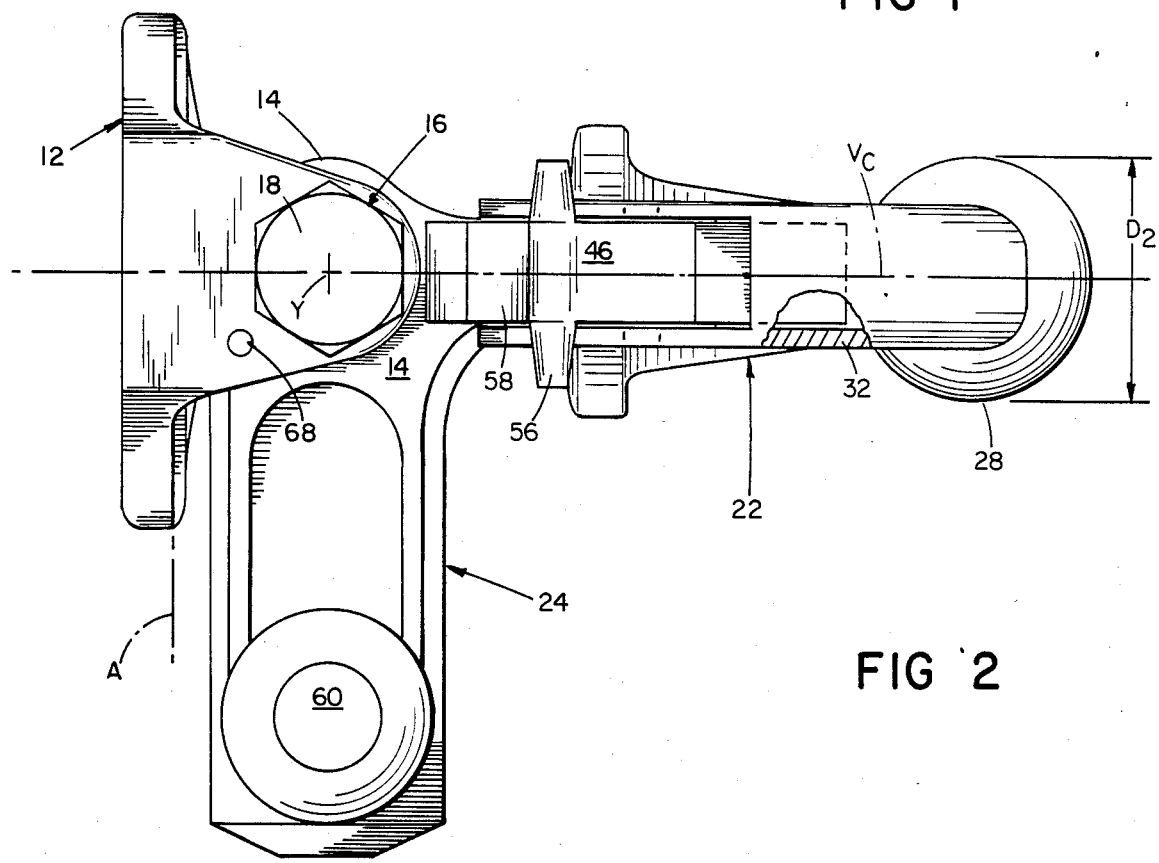

Referring also to FIG. 2, support 14 has two arms 22, 24 lying substantially at 90° to each other. The first arm 22, shown most clearly in FIG. 1, is configured as a novel, unitary pintle and ball hitch. Pintle hook 26, is of size and shape to receive a lunette coupler at the end of the trailer tongue. At the end of hook 26 is formed ball 28 a standard hitch size, e.g. 2 inch diameter to receive a 2 inch ball coupler. To provide the high load rating required of pintle type trailer hitches, e.g. 14,000 pounds or higher, the hook and ball are integrally formed, e.g. as a forging or a casting of malleable iron. Pivotally attached at inner or forward end 30 of hook 26 is a specially shaped and positioned closure 32 pivoting on axis X of horizontal pivot pin 34. In the closed position (FIG. 1), closure 32 closes pintle hook 26, to form specially shaped aperture 36, e.g. to prevent release of a lunette during towing. The aperture 36 is characterized by having a lower circular open portion with center $C_1$ lying on a horizontal plane $H_1$ which substantially bisects the bolt pattern of pad 12, this plane lying below the horizontal plane $H_B$ projected tangent of the undersurface of the ball.

In its preferred form, as shown; this aperture is of diameter $D_1$ substantially equal to the diameter, $D_2$, of ball 28; its center $C_1$ is located on the line through the center $C_2$ of the ball which makes an angle of about 45° to the horizontal; and its center $C_1$ is spaced from ball center $C_2$ a distance, 0, equal to diameter $D_1$, such that the inner surface 38 of the hook merges substantially tangentially with the curved surface 44 of the ball in a smooth transition.

Thus constructed, the rearward most point 42 of aperture 36, i.e. the point lying furthest rearward from vertical plane A of bolt-up plate 12, where the lunette will ride during towing due to the drag of the load, lies in a horizontal plane $H_1$ close the plane, $H_c$ passing through the center of the attachment pattern of the bolts. As shown in FIG. 2, the vertical center plane $V_c$ of the hitch also bisects the center of the bolt pattern. Thus the towing load on the pintle hook is distributed substantially equally to each of the attaching bolts. The intersection of the verticle and horizontal centerplane, $V_c$ and $H_c$, respectively, and the relative position of towing centerplane $H_1$, is shown in FIG. 3 where the trailer hitch is shown in face view.) Thus constructed, the load on the ball 28 is deliberately located above the plane of symmetry of the bolt pattern, thus permitting only the typically lighter loads, common with ball hitches, to be applied with unbalance, off-center of the attachment bolt pattern.

The hook 26 is also especially shaped, continually increasing forwardly in vertical cross-sectional size, from the point of merger with the ball 28, forwardly to merger with the support 14. The forward vertical portion 30 of the hook that bounds the aperture 36 is of thick rugged construction, and extends to define the forward wall of the aperture 36 to the approximate level of the top of ball 28.

In a superficially contrary form, the exterior cross-section of the closure 32 (typically a hollow molded casting as shown by the section taken in FIG. 2) increases in vertical dimension rearwardly. Its upper surface $S_U$ is centered at $C_3$ at approximately the same level vertically as center $C_2$ of the ball and the radius R of this surface $S_U$ is approximately (but slightly greater than) the distance between centers $C_2$ and $C_3$. Thus constructed, the upper surface $S_U$ of the closure overlies the ball and provides a smooth transition with the outer surface of the ball, the upper surface at the point of merger with the ball lying at a substantial angle to the vertical (approximately 45°) to minimize the vertical projection of the closure with advantages to be described below.

In an unsymmetrical manner, the lower surface $S_L$ of the closure 32, though also circular in the vertical plane and with a center lying in the same horizontal plane as center $C_2$ and $C_3$ has its center $C_4$ displaced forwardly so that the projection of this surface comes approximately tangent with the forward surface of ball 28 (indicated by dashed projection line T). Also, thus centered, the inner surface of the closure reaches the forward vertical surface of the hook at point I, only slightly beyond the highest point of this curved lower surface so that there is virtually no rearward projected vertical extent that could receive an impact.

Thus constructed the attachment is shaped to deflect accidental damaging external blows from the outside that might arise, e.g., by backing of the towing vehicle inadvertently into the trailer prior to hook-up and to avoid internal damage from the lunette during braking when the load tends to override the towing vehicle. This impact, in the design just described, is absorbed by the rugged portion of the base of the pintle, even if the tongue load is light and causes the pintle to rise or if there is a mismatch in the vertical height of the load and the towing vehicle such that the tongue slopes upwardly towards the towing vehicle.

The free end 40 of closure 32 engages on the surface of ball 28, with the inner surface 43 of closure 32 providing a relatively smooth transition into surface 44 of ball 28, both forming the surface defining aperture 36, to prevent the lunette from lodging in a position during towing where load could bear against closure 32.

Closure 32 is held in place by latch 46, which pivots about pin 48. In closed position (FIG. 1), the closure is prevented from opening by engagement of rear surface 52 of latch 46 upon surface 52 of hook end 30. A cotter pin (not shown) inserted through hole 54 secures the latch.

Figure 6:
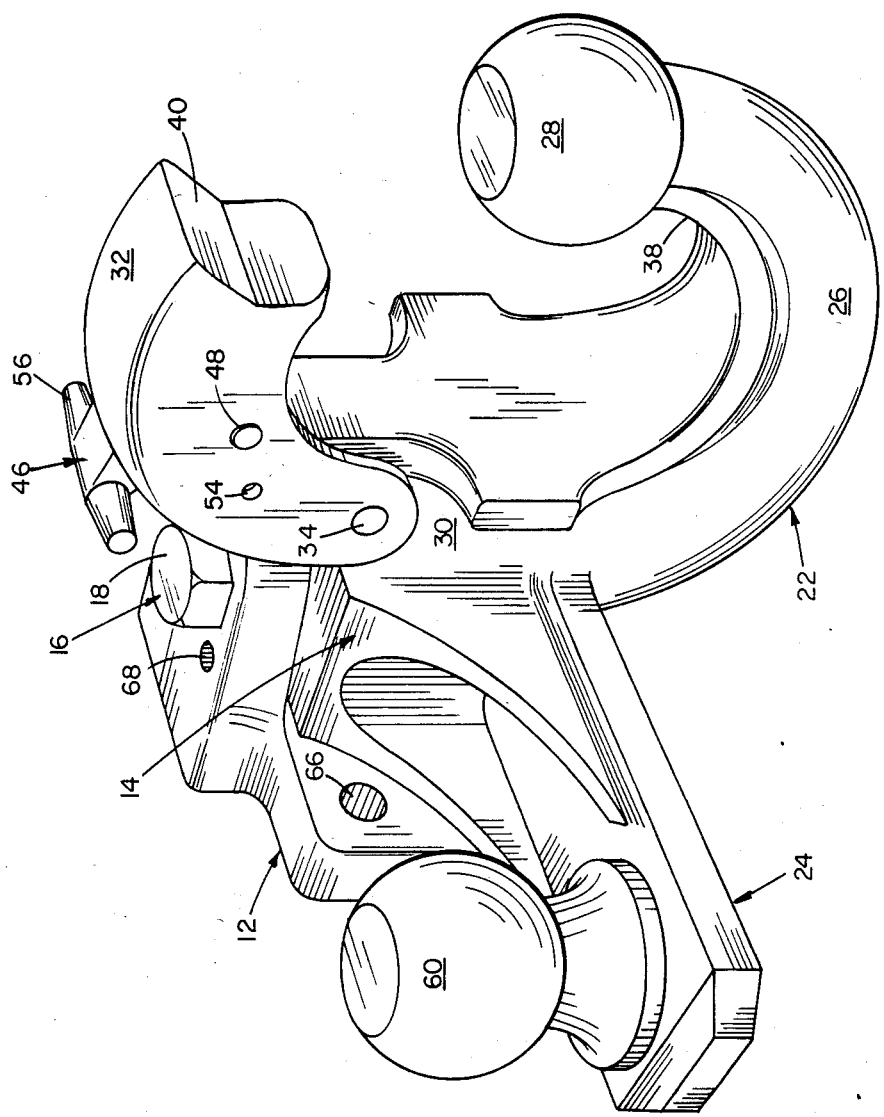
FIG. 6 is an isometric view of the trailer hitch of FIG. 1, with the pintle hook in towing position and the latch open, e.g. to allow towing with the ball on the hook end or to insert a lurette.

To open closure 32, the pin in latch 46 is removed and latch 46 is raised by gripping handle 56 and the closure pivots on axis X. The pin is inserted again through 54 and the engagement of surface 50 on surface 58 of hook end 30 to holds closure 32 in open position (See FIG. 6).

Referring to FIG. 3, the trailer hitch is shown in face view, with intersection of the V and H axes more clearly shown at the center of the attachment bolt hole pattern.

In FIG. 4, another face view of the trailer hitch, arm 24 has been positioned along vertical center axis $V_c$ with ball 60 of hitch now aligned. The second ball 60 is of different size, of course, than ball 28, typically of smaller diameter, due to the lower load rating of a threaded pin supported device, and is attached to the arm 24 by inserting threaded pin 62 through the hole provided and securing with nut 64. This manner of attachment allows the ball size to be changed as desired, with the resulting lower load rating, and also allows other type hitch constructions to be employed, e.g. the w-shaped configuration commonly used on farm implements.

Operation

The trailer hitch is attached to the rear of a vehicle by bolts extending through holes 66 in pad 12. Before securing, the hitch is centered so the drag of the trailer will be centered.

To use pintle hook 26, support 14 is pivoted on pin 16 to align arm 22 with the verticale center axis $V_c$. A cotter pin (not shown) typcially connected to the hitch by a chain or cable, is inserted into hole 68 in pad 12, which is aligned with holes in support 14, to prevent movement of support 14 about axis Y of pin 16.

The cotter pin is removed from hole 54, and latch 46 is disengaged by lifting handle 56, which also causes closure 32 to rotate about axis X to open. Handle 56 is released and spring 53 urges the latch to the closed position where latch surface 48 engages upon hook surface 58 to hold closure 32 open. (FIG. 6) The pin is returned to hole 54 to secure closure 32 open. A lunette is then placed over pintle hook 26 and closure 32 is closed and secured. If it is desired to use ball 28 for towing, the closure is simply left open.

Figure 5:
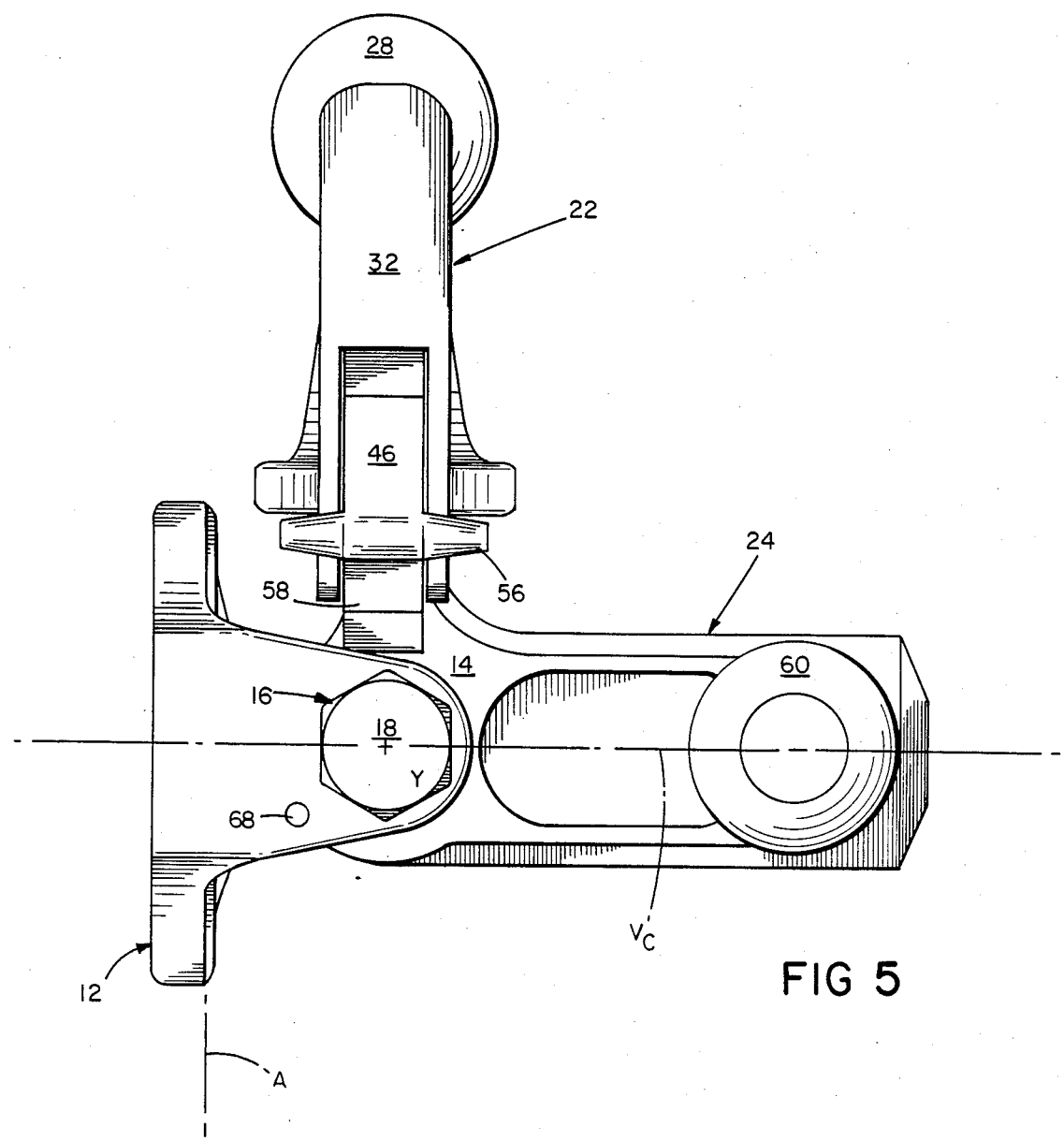
FIG. 5 is a top view thereof.

To change modes from the pintle hook 26 (or ball 28), to the second ball 60, a cotter pin (not shown) is simply removed from hole 68 and support 14 is pivoted about axis Y, and the pin is reinserted. FIG. 5 is a top view of the hitch with ball 60 in towing position.

Referring back to FIG. 1, during towing with pintle hook 26, the lunette resides within aperture 36, against rearmost surface 38, due to drag. If the towing vehicle brakes quickly, the inertia of the trailer will cause the lunette to move forward. However, due to the novel configuration of the hook and the lower closure surfaces, the stopping impact will be at least partially absorbed by the mass of the hook itself. Even if the trailer is loaded so the tongue is light, or is directed upward by a height difference between vehicle and trailer, impact will be with the underside of ball 28 or will be diminished by the receding angle of surface $S_L$. Also, as noted above, upper surface $S_U$ of closure 32 is also configured to deflect impact e.g., during backing, and as seen in FIG. 2, is also protected by the rearward projection of ball 28, and the lateral projections of the ball and also of hook portion 30 from damaging impact from those directions.

Other embodiments are within the following claims.

I claim:

1. In a trailer hitch adapted for attachment to a lunette coupler or a ball coupler comprising attachment means for affixing said trailer hitch to a vehicle,
    said means having a pattern of attachment for said hitch to a vehicle,
a pintle hook supported by said attachment means,
a ball mounted on the free end of said hook and adapted to receive a ball coupler,
a closure means pivotally mounted to the base end of said hook, opposed to said free end, and pivotable between a closed position in engagement with said ball and an open position spaced from said ball,
latch means for selectively fixing said closure in said open and in said closed positions,
    said closure in said closed position defining, with said hook, a closed aperture for holding a lunette therewithin against release, and
    said closure in said open position adapted to permit introduction of said lunette over the ball, and also alternatively permitting a ball coupler to seize said ball,

THE IMPROVEMENT WHEREIN, said aperture defined by said closure and said hook includes a lower circular open portion, the center point of said lower circular portion lying on a first horizontal plane substantially bisecting the pattern of attachment of said hitch,
said first horizontal plane lying below a second horizontal plane projected tangent to the under surface of said ball,
the point within the aperture defined by said pintle hook and said closure in closed position which lies the furthest rearward from a vertical plane of said attachment means, being within said lower circular portion of said aperture in said first horizontal plane passing through the center of said attachment pattern,
whereby, during towing, the load of the trailer attached by said lunette is evenly distributed over said pattern of attachment.

2. The trailer hitch of claim 1 wherein said closure increases rearwardly in vertical dimension;

the upper surface of said closure following a curve centered in a horizontal plane approximately bisecting the center of said ball, and said curve having a radius of approximately the same, but slightly less, length than the distance between the center of said ball and the center of said curve, whereby the upper surface of said closure closely overlies said ball and provides a smooth transition with the surface thereof, and the surface of said ball extends rearward beyond the end of said closure for protection during backing.

3. The trailer hitch of claim 1 wherein said closure increases rearwardly in vertical dimensions, the lower surface of said closure follows a curve centered in a horizontal plane approximately bisecting the center of said ball, the center of said curve lying forwardly of the center of the curve of the upper closure surface, whereby the projection of the lower surface of said closure comes approximately tangent to the forward surface of said ball.

4. The trailer hitch of claim 3 wherein said inner closure surface intersects the forward vertical wall of said hook defining said aperture at a point approximately adjacent the peak of said curve, whereby said lower closure surface has virtually no rearwardly projected vertical extent exposed to possible impact.

5. A trailer hitch for towing attachment to a lunette coupler or a ball coupler, said hitch comprising means for attaching the hitch to a vehicle consisting of a pad having a pair of vertically-spaced bracket arms extending horizontally from a plane of attachment, and, pivotally connected thereto in a force transmitting relationship, an integrally-formed, towing-force transmitting hitch support body which extends solidly over the distance between said opposed bracket arms, which defines, with said bracket arms, a bore for receiving a heavy duty vertical hinge pin, and which has integrally formed first and second hitch arms disposed generally at right angles to each other and to the axis of said hinge pin, the first said hitch arm comprising a pintle hook integrally merged at its forward end in a thick, rugged construction with said hitch support body, and a first ball integrally formed on the free end of said hook, and the second said hitch arm, also integrally merged into said hitch support body, having a ball thereupon.

6. The trailer hitch support of claim 5 wherein said hitch support arms are adapted, in position for towing attachment, to align substantially perpendicular to the plane of said attachment means.

7. The trailer hitch of claim 5 wherein said second ball is removable and said second support arm is adapted to receive trailer hitches of other configurations for towing vehicles having corresponding coupler configuration.

8. The trailer hitch of claim 5 wherein said angle is of the order of 45°.

9. The trailer hitch of claim 5 further comprising:

a closure means pivotally mounted on the base end of said hook, opposed to the free end, and pivotable between a closed position in engagement with said first ball and an open position spaced from said first ball, latch means for selectively fixing said closure in said open and in said closed positions, said closure in said closed position defining, with said hook, a closed aperture for holding a lunette therewithin against release, said closure in said open position adapted to permit introduction of said lunette over the ball, and also alternatively permitting a ball coupler to seize said ball, and said attachment means having a pattern of attachment for said hitch to a vehicle.

10. The trailer hitch of claim 9 wherein said aperture defined by said closure and said hook includes a lower circular open portion, the center point of said lower circular portion lying on a first horizontal plane substantially bisecting the pattern of attachment of said hitch, said first horizontal plane lying below a second horizontal plane projected tangent to the under surface of said first ball, the rearmost point within the aperture defined by said pintle hook and said closure in closed position to receive and hold said lunette, lying the furthest rearward from the vertical plane of said attachment means, lies within said lower circular portion of said aperture in said first horizontal plane passing through the center of said attachment pattern, whereby during towing, the load of the trailer attached by said lunette is evenly distributed over said pattern of attachment.

11. The trailer hitch of claim 9 wherein the diameter of said lower circular portion is substantially equal to the diameter of said first ball.

12. The trailer hitch of claim 9 wherein a line projected through the center of said first ball and the center of said lower circular portion lies at an angle to the horizontal.

13. The trailer hitch of claim 9 wherein the center of said first ball is spaced from the center of said lower circular pattern by a distance substantially equal to the diameter of said first ball, whereby the inner surface of said hook defining said lower circular portion merges substantially tangentially with the curved under surface of said first ball in a smooth transition.

14. The trailer hitch of claim 9 wherein the forward wall of said hook defining said aperture extends substantially vertically to approximately the height of said first ball.

15. The trailer hitch of claim 9 wherein said closure increases rearwardly in vertical dimension;

the upper surface of said closure following a curve centered in a horizontal plane approximately bisecting the center of said first ball, and said curve having a radius of approximately the same, but slightly less, length than the distance between the center of said first ball and the center of said curve, whereby the upper surface of said closure closely overlies said first ball and provides a smooth transition with the surface thereof, and the surface of said first ball extends rearward beyond the end of said closure for protection during backing.

16. The trailer hitch of claim 9 wherein
said closure increases rearwardly in vertical dimensions,
the inner surface of said closure follows a curve centered in a horizontal plane approximately bisecting the center of said first ball,
the center of said curve lying forwardly of the center of the curve of the outer closure surface,
whereby the projection of the inner surface of said closure comes approximately tangent to the forward surface of said first ball.

17. The trailer hitch of claim 16 wherein
said inner closure surface intersects the forward vertical wall of said hook defining said aperture at a point approximately adjacent the peak of said curve,
whereby said inner closure surface has virtually no rearwardly projected vertical extent exposed to possible impact.

18. In a trailer hitch adapted for attachment to a lunette coupler or a ball coupler comprising
attachment means for affixing said trailer hitch to a vehicle,
a pintle hook supported by said attachment means,
a ball mounted on the free end of said hook and adapted to receive a ball coupler,
a closure means pivotally mounted to the base end of said hook and pivotable between a closed position in engagement with said ball and an open position spaced from said ball,
latch means for selectively fixing said closure in said open and in said closed positions,
said closure in said closed position, defining with said hook a closed aperture for holding a lunette therewithin against release,
and said closure in said open position adapted to permit introduction of said lunette over the ball, and also alternatively permitting a ball coupler to seize said ball,
THE IMPROVEMENT WHEREIN,
said closure means at said ball has a first portion which substantially overlies said ball and a second portion which extends downwardly along the upper inside surface of said ball, said second portion further having a forwardly directed, lower surface preceding said ball which is shaped, upon contact with a lunette coupler during forward movement of said vehicle, to guide said coupler downward so that said coupler moves into a towing position lying below the level of the center of said ball.

19. The hitch of claim 18 wherein said forwardly directed, lower surface of said closure means is curved downwardly, rearwardly, in a manner to end in a generally tangential relationship with the forwardly directed, lower surface of said ball to guide said lunette coupler into towing position.

20. The hitch of claim 18 or 19 wherein the upper surface of said first portion of said closure means is of arcuate form arranged in effect to provide a smooth forwardly curved transition from the rear surface of said ball to serve as a deflector to reduce damage in the event that the vehicle backs the hitch into an object.

21. The hitch of claim 18 or 19 wherein the surface of said first portion lying adjacent said ball is substantially horizontal and the surface of said second portion lying adjacent said ball extends at a substantial angle to the horizontal.

22. The hitch of claim 18 wherein
said aperture includes a lower circular open towing portion, the center point of said lower circular portion lying below a second horizontal plane projected tangent to the under surface of said ball.

23. In a trailer hitch adapted for attachment to a lunette coupler or a ball coupler comprising
attachment means for affixing said trailer hitch to a vehicle,
said means having a pattern of attachment for said hitch to a vehicle,
a pintle hook supported by said attachment means,
a ball mounted on the free end of said hook and adapted to receive a ball coupler,
a closure means pivotally mounted to the base of said hook and pivotable between a closed position in engagement with said ball and an open position spaced from said ball,
latch means for selectively fixing said closure in said open and in said closed positions,
said closure in said closed position defining with said hook a closed aperture for holding a lunette therewithin against release,
and said closure in said open position adapted to permit introduction of said lunette over the ball, and also alternatively permitting a ball coupler to seize said ball,
THE IMPROVEMENT WHEREIN,
said aperture includes a lower circular open portion, the center point of said lower circular portion lying on a first horizontal plane substantially bisecting the pattern of attachment of said hitch,
said first horizontal plane lying substantially below the center of said ball.

24. The trailer hitch of claim 1, 18, 22 or 23 wherein the diameter of said lower circular portion is substantially equal to the diameter of said ball.

25. The trailer hitch of claim 1, 18, 22 or 23 wherein a line projected through the center of said ball and the center of said lower circular portion lies at an angle to the horizontal.

26. The trailer hitch of claim 25 wherein
said angle is of the order of 45°.

27. The trailer hitch of claim 1, 18, 22 or 23 wherein the center of said ball is spaced from the center of said lower circular portion by a distance substantially equal to the diameter of said ball,
whereby the inner surface of said hook defining said lower circular portion merges substantially tangentially with the curved under-surface of said ball in a smooth transition.

28. The trailer hitch of claim 1, 18, 22 or 23 wherein said hook increases forwardly in vertical cross-section.

29. The trailer hitch of claim 1, 18, 22 or 23 wherein the forward wall of said hook defining said aperture extends substantially vertically to approximately the height of said ball.

30. The trailer hitch of claim 1, 18, 22 or 23 wherein the hook and ball are integrally formed.

* * * * *

UNITED STATES PATENT AND TRADEMARK OFFICE
CERTIFICATE OF CORRECTION

PATENT NO. : 4,568,098
DATED : February 4, 1986
INVENTOR(S) : Ernest A. Landry, Jr.

It is certified that error appears in the above-identified patent and that said Letters Patent is hereby corrected as shown below:

Column 5, line 29, "to holds closure 32" should be
--holds closure 32--.

Signed and Sealed this

Third Day of June 1986

[SEAL]

Attest:

DONALD J. QUIGG

Attesting Officer  Commissioner of Patents and Trademarks